United States Patent
Ochiai

(10) Patent No.: US 6,494,799 B1
(45) Date of Patent: Dec. 17, 2002

(54) POWER TRANSMISSION DEVICE

(75) Inventor: Yoshihiro Ochiai, Isesaki (JP)

(73) Assignee: Sanden Corporation, Gunma (JP)

( * ) Notice: Subject to any disclaimer, the term of this patent is extended or adjusted under 35 U.S.C. 154(b) by 66 days.

(21) Appl. No.: 09/716,418

(22) Filed: Nov. 21, 2000

(30) Foreign Application Priority Data

Dec. 1, 1999 (JP) .......................................... 11-342245

(51) Int. Cl.$^7$ .............................. F16D 3/50; F16D 3/00; F16H 55/14; F16H 55/32
(52) U.S. Cl. .......................... 474/94; 474/199; 464/73; 464/89
(58) Field of Search .............................. 474/70, 69, 94, 474/199; 464/73, 36, 89; 74/574; 192/81, 56.5, 56.57, 56.62

(56) References Cited

U.S. PATENT DOCUMENTS

| | | |
|---|---|---|
| 1,767,566 A | 6/1930 | Updike |
| 1,941,061 A | 12/1933 | Thiry |
| 2,356,842 A | 8/1944 | Helmond |
| 3,058,321 A | 10/1962 | Aske |
| 3,654,777 A | 4/1972 | Grundman |
| 3,718,009 A | 2/1973 | Perina |
| 4,337,855 A * | 7/1982 | Bennett ................... 192/84.94 |
| 4,748,865 A | 6/1988 | Umezawa et al. |
| 5,377,962 A | 1/1995 | Ochs et al. |
| 5,516,331 A | 5/1996 | Morr et al. |
| 5,564,981 A | 10/1996 | Iwabuchi et al. |
| 5,704,839 A | 1/1998 | Michael et al. |
| 5,944,156 A | 8/1999 | Hatakeyama |
| 6,169,347 B1 * | 1/2001 | Sakamoto et al. ....... 192/84.95 |

FOREIGN PATENT DOCUMENTS

| | | | |
|---|---|---|---|
| EP | 751383 | | 2/1955 |
| JP | 8135752 | | 5/1996 |
| JP | 9004564 | | 1/1997 |
| JP | 10311399 | | 11/1998 |
| JP | 179569 A | * | 6/2000 |
| JP | 346168 A | * | 12/2000 |
| JP | 3953 A | * | 1/2001 |
| JP | 127176 A | * | 5/2001 |
| JP | 124177 A | * | 8/2001 |

* cited by examiner

Primary Examiner—Thomas R. Hannon
Assistant Examiner—Marcus Charles
(74) Attorney, Agent, or Firm—Baker Botts L.L.P.

(57) ABSTRACT

A power transmission device includes a driving rotary member, a driven rotary member fixed to one end of a rotary shaft of a driven device, a first intermediate friction member disposed between the driving rotary member and the driven rotary member, and a spring for pressing the driving rotary member against the first intermediate friction member, thereby pressing the first intermediate friction member against the driven rotary member. The driving rotary member is provided with at least one first concave segment, the driven rotary member is provided with at least one convex segment and at least one second concave segment, and the first intermediate friction member is provided with at least one lug. The at least one lug is adapted to engage the at least one first concave segment and to simultaneously abut the at least one convex segment. The at least one lug also is adapted to slip off the at least one convex segment, disengage from the at least one first concave segment, and engage the at least one second concave segment when a torque applied to the driving rotary member exceeds a predetermined torque.

8 Claims, 4 Drawing Sheets

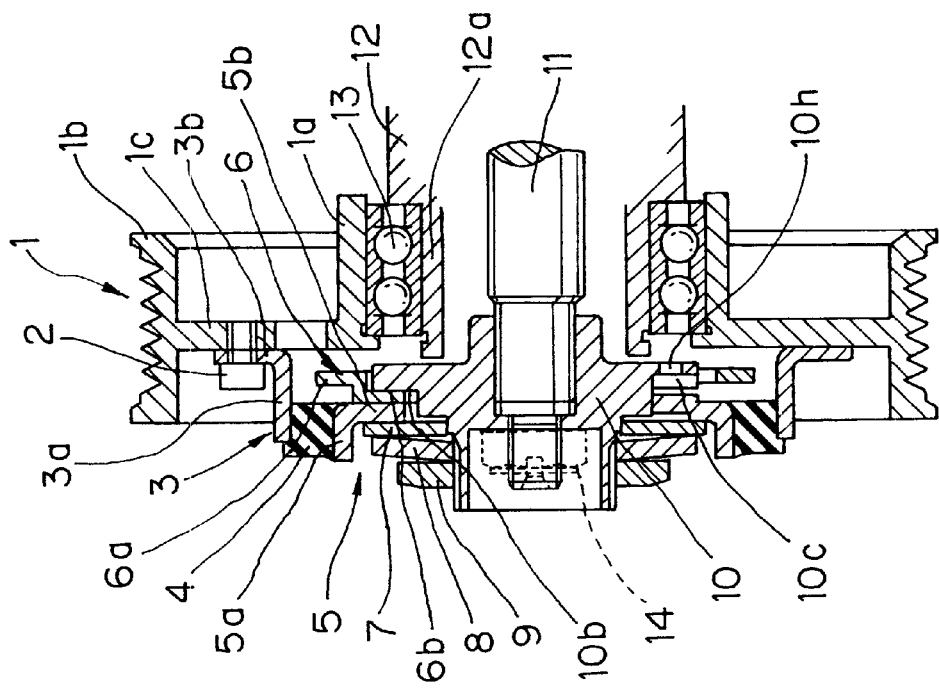
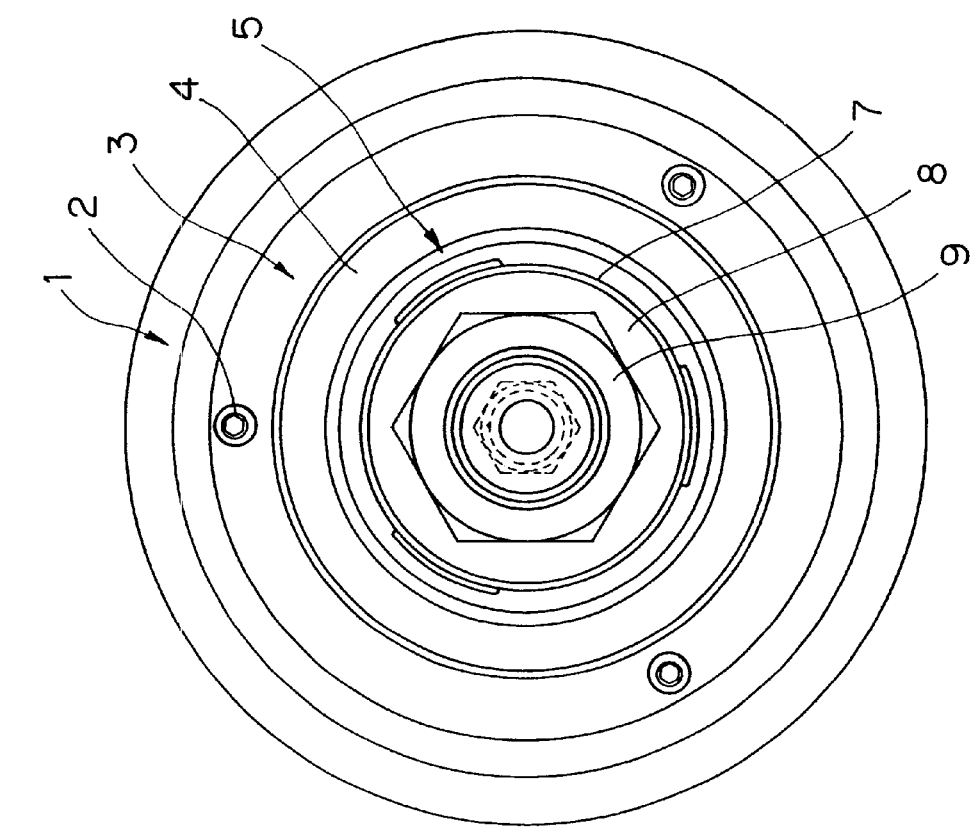

US 6,494,799 B1

POWER TRANSMISSION DEVICE

BACKGROUND OF THE INVENTION

The present invention relates to a power transmission device provided with the function of a torque limiter. The present invention can be widely used in compressors, industrial machinery, etc.

Many kinds of this type of power transmission devices have been proposed. One is disclosed in Japanese Patent Laid-Open Publication No.311399/1998, which will be explained referring to FIGS. 3 to 5.

Figure 5:
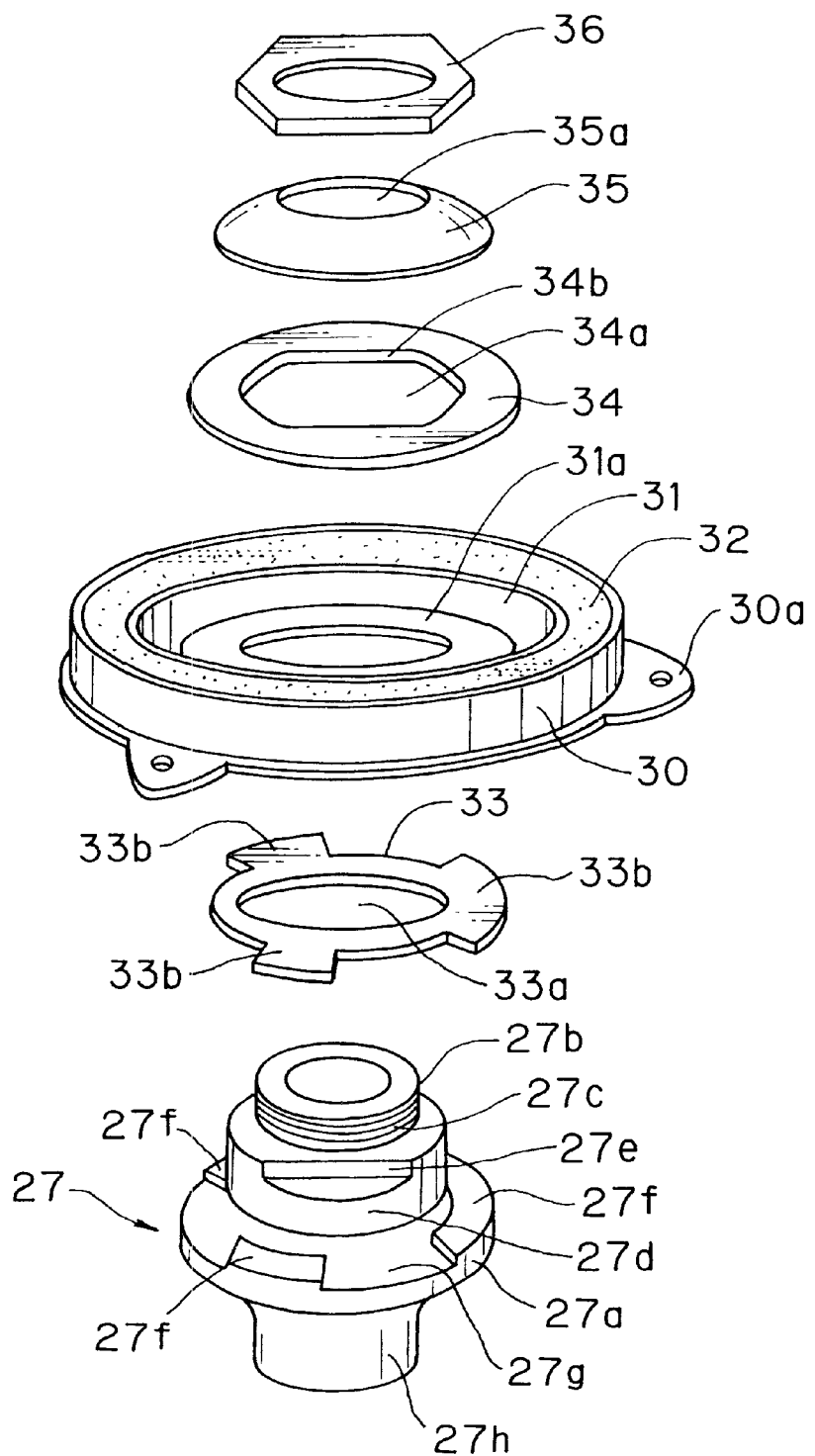

The power transmission device taught by Japanese Patent Laid-Open publication No.311399/1998 comprises a cylindrical rotor 22 made of ferro-alloy inserted in a pulley 21. The rotor 22 is welded to the pulley 21. A ball bearing 23 is disposed inside of the rotor 22. The rotor 22 is supported to be rotatable by a cylindrical protrusion 25a of a front housing 25 of a compressor (driven device) 24 through the ball bearing 23. A hub 27 operating as a driven rotary member is inserted in a rotary shaft 26 of the compressor 24. The hub 27 has a substantially cylindrical shape as shown in FIG. 5.

The hub 27 is splined to the rotary shaft 26. A ring-shaped stopper plate 28 is welded to the hub 27. A bolt 29 is inserted in the central hole of the stopper plate 28 to be threaded into a screw hole of the rotary shaft 26, thereby fixing the hub 27 to the rotary shaft 26. The stopper plate 28 locates the hub 27 relative to the rotary shaft 26. Thus, the hub 27 can rotate integrally with the shaft 26.

The hub 27 is provided with a cylindrical portion 27c at its one end distant from the compressor 24. The cylindrical portion 27c is provided with an externally threaded portion 27b. The hub 27 is provided with a cylindrical portion 27d adjacent the cylindrical portion 27c. The outer diameter of the cylindrical portion 27d is larger than that of the cylindrical portion 27c. The periphery of the cylindrical portion 27d is partially cut away to form a pair of parallel flat chord portions 27e. The hub 27 is provided with a flange portion 27a adjacent the cylindrical portion 27d. The outer diameter of the flange portion 27a is larger than those of the cylindrical portions 27c and 27d.

Three fragmentary-annular-ring-shaped convex segments 27f are formed on the periphery of the end face of the flange portion 27a close to the cylindrical portion 27d. The end face of the flange portion 27a close to the cylindrical portion 27d forms a concave segment 27g except at the fragmentary-annular-ring-shaped convex segments 27f. A cylindrical portion 27h is formed on the end face of the flange portion 27a close to the compressor 24. The outer diameter of the cylindrical portion 27h is small enough to leave a relatively large space between its outer surface and the inner surface of the cylindrical protrusion 25a of the front housing 25.

The power transmission device comprises a cylindrical outer holder 30 made of ferro-alloy. The outer holder 30 is provided with three radially outwardly protruding lugs 30a. The outer holder 30 is fixed to the pulley 21 by three bolts 37 penetrating the lugs 30a. The power transmission device comprises a cylindrical inner holder 31 made of a ferro-alloy such as stainless steel. The inner holder 31 is provided with a radially inwardly protruding flange 31a.

A rubber ring 32 is disposed between the outer holder 30 and the inner holder 31 to be seized by them. Therefore, torque is transmitted from the pulley 21 through outer holder 30 and the rubber ring 32 to the inner holder 31. The pulley 21, the rotor 22, the outer holder 30, the rubber ring 32 and the inner holder 31 constitute a driving rotary member rotating integrally.

The flange 31a of the inner holder 31 fits snugly on the cylindrical portion 27d of the hub 27 to constitute a driving friction member. A washer 33 is disposed between the flange 31a of the inner holder 31 and the fragmentary-annular-ring-shaped convex segments 27f of the hub 27 to constitute an intermediate friction member.

The flange portion 27a of the hub 27 constitutes a first driven friction member. The end faces of the fragmentary-annular-ring-shaped con vexes 27f are coated with fluororesin coating material to reduce and stabilize the friction coefficient $\mu_1$ of the abutting surfaces between the fragmentary-annular-ring-shaped con vexes 27f and the washer 33. The fluororesin coating material is an electrical insulating material that protects the fragmentary-annular-ring-shaped con vexes 27f from electric corrosion.

The washer 33 has annular-ring-shape as shown in FIG. 5 and is made of stainless steel or phosphor bronze. The washer 33 is provided with a central hole 33a and three fragmentary-annular-ring-shaped lugs 33b radially outwardly protruding from its outer periphery. The washer 33 snugly fits on the cylindrical portion 27d of the hub 27. The shape and size of the fragmentary-annular-ring-shaped lugs 33b coincide with those of the fragmentary-annular-ring-shaped con vexes 27f of the hub 27.

Figure 3:
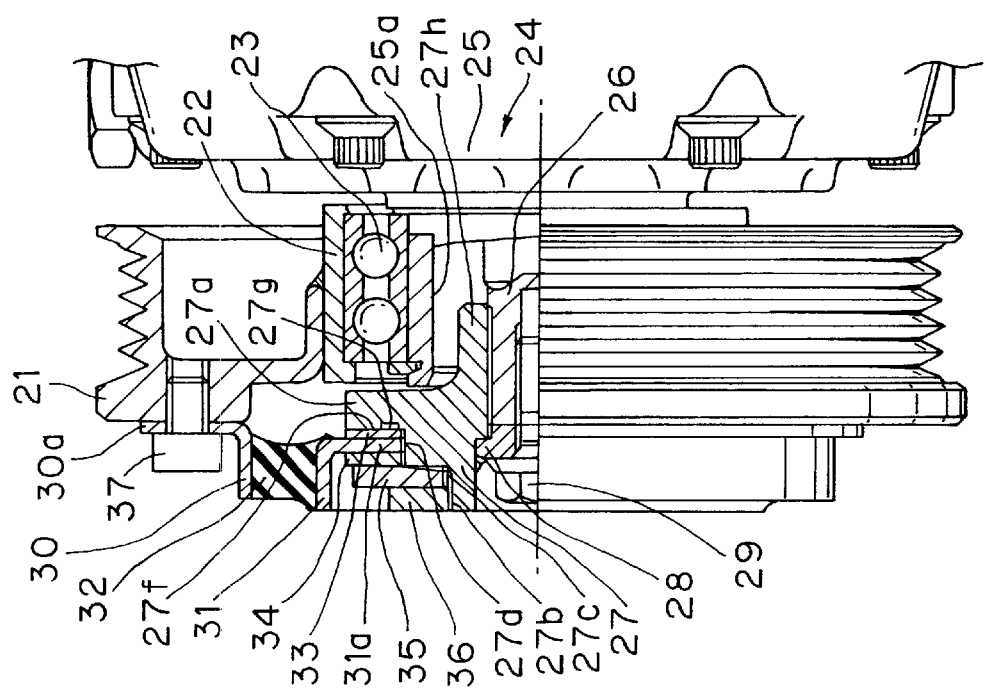
Figure 4:
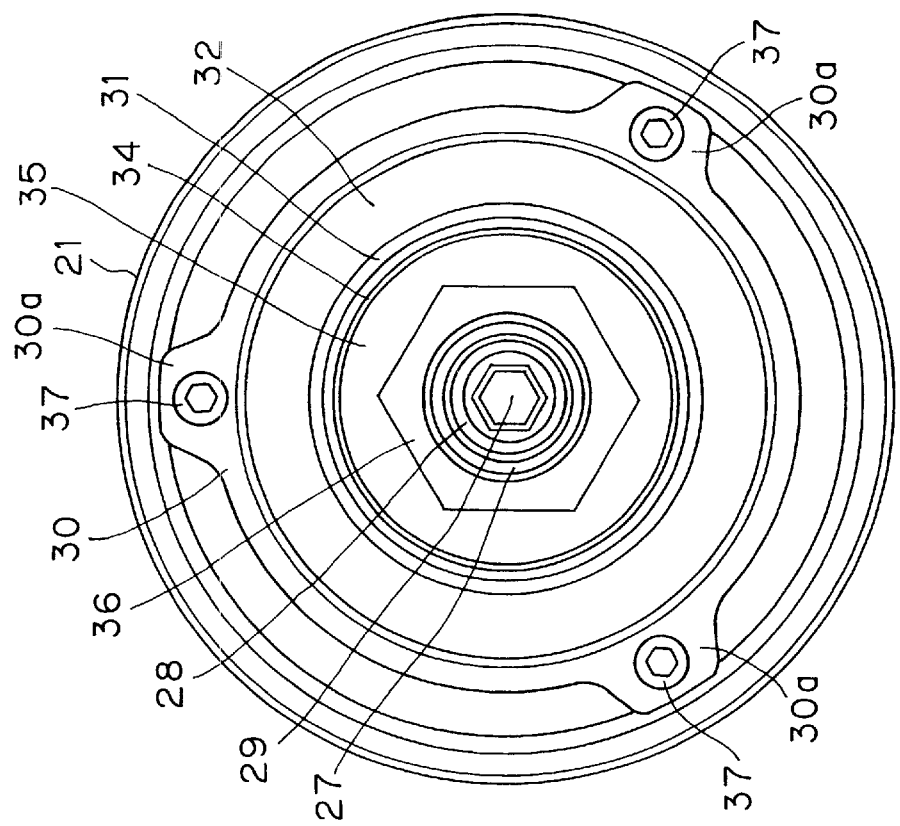

The washer 33 and the hub 27 are assembled so that the fragmentary-annular-ring-shaped lugs 33b abut the fragmentary-annular-ring-shaped convex segments 27f. FIG. 3 shows the assembled condition in normal operation of the compressor 24, wherein the fragmentary-annular-ring-shaped lugs 33b abut the fragmentary-annular-ring-shaped convex segments 27f.

A washer 34 is disposed to sandwich the flange portion 31a of the inner holder 31 in collaboration with the washer 33. The washer 34 constitutes a second driven friction member. The washer 34 is made of stainless steel and coated with fluororesin coating material to reduce and stabilize the friction coefficient of the abutting surfaces between the flange 31a of the inner holder 31 and the washer 34. The fluororesin coating material is an electrical insulating material that protects the washer 34 from electric corrosion.

As shown in FIG. 5, the washer 34 is annular-ring-shaped and provided with a substantially hexagonal hole 34a having a pair of parallel straight edges 34b. The washer 34 fits on the pair of parallel flat chord portions 27e of the hub 27 to rotate integrally with the hub 27.

A disk spring 35 is disposed adjacent the washer 34. As shown in FIG. 5, the disk spring 35 is provided with a central circular hole 35a. The disk spring 35 fits on the cylindrical portion 27c of the hub 27 with its internal edge fitted snugly on the external side surface of the cylindrical portion 27c.

A nut 36 is disposed adjacent the disk spring 35 to be threaded onto the externally threaded portion 27b of the hub 27.

Fastening force acting on the nut 36 is transmitted to the disk spring 35 to axially compress it. Therefore, fastening force acting on the nut 36 determines the spring force (resilient reaction force) of the disk spring 35. The spring force of the disk spring 35 presses the outer periphery of the disk spring 35 against the outer periphery of the washer 34.

The friction coefficient $\mu_1$ of the abutting surfaces between the fragmentary-annular-ring-shaped convex segments 27f of the hub 27 and the fragmentary-annular-ring-shaped lugs 33b of the washer 33 is set at a small value of about 0.1.

Micro-irregularities are formed on the surface of the flange 31a of the inner holder 31 opposite the washer 33 by shot blasting or the like to set the friction coefficient $\mu_2$ of the abutting surfaces between the flange 31a of the inner holder 31 and the fragmentary-annular-ring-shaped lugs 33b of the washer 33 at a large value of about 0.25.

The friction coefficient $\mu_3$ of the abutting surfaces between the flange 31a of the inner holder 31 and the washer 34 is set at a small value substantially equal to the friction coefficient $\mu_1$.

The procedure for assembling the power transmission device is as follows. First, the pulley 21, the rotor 22 and the ball bearing 23 are integrated in a unit to be mounted on the cylindrical protrusion 25a of the front housing 25. Then, the hub 27 provided with stopper plate 28 is splined onto the rotary shaft 26 of the compressor 24, whereafter the hub 27 is fixed to the rotary shaft 26 with the bolt 29.

The washer 33 is fitted on the cylindrical portion 27d of the hub 27 with the fragmentary-annular-ring-shaped lugs 33b abutting the fragmentary-annular-ring-shaped convexes 27f. The outer holder 30, the rubber ring 32 and the inner holder 31 are integrated in a unit to be mounted on the pulley 21, that is, the flange 31a of the inner holder 31 is fitted on the cylindrical portion 27d of the hub 27 and the lugs 30a of the outer holder 30 are fixed to the pulley 21 with the bolts 37.

The washer 34 is fitted on the pair of parallel flat chord portions 27e of the hub 27, the disk spring 35 is fitted on the cylindrical portion 27c of the hub 27, and the nut 36 is threaded onto the externally threaded portion 27b of the hub 27 to a predetermined extent, so that the disk spring 35 is axially compressed to produce a predetermined spring force. The outer periphery of the disk spring 35 is pressed against the outer periphery of the washer 34. Therefore, the washer 34 engages the flange 31a of the inner holder 31 under a predetermined friction force acting on the abutting surfaces, the flange 31a of the inner holder 31 engages the washer 33 under a predetermined friction force acting on the abutting surfaces, and the washer 33 engages the fragmentary-annular-ring-shaped convexes 27f under a predetermined friction force acting on the abutting surfaces.

After completion of the assembly, the rotation of the inner holder 31 is transmitted to the hub 27 through a first friction engagement path from the flange 31a of the inner holder 31 through the washer 33 to the flange portion 27a of the hub 27 and a second friction engagement path from the flange 31a of the inner holder 31 through the washer 34 to the pair of parallel flat chord portions 27e of the hub 27.

Operation of the compressor 24 will be described. When the pulley 21 rotates, the rotor 22, the outer holder 30, the rubber ring 32 and the inner holder 31 which are integrated with the pulley 21 as a unit also rotate.

Thanks to the spring force of the disk spring 35 caused by fastening force F acting on the nut 36, the washer 34 engages the flange 31a of the inner holder 31 under a predetermined friction force acting between their abutting surfaces, the flange 31a of the inner holder 31 engages the washer 33 under a predetermined friction force acting between their abutting surfaces, and the washer 33 engages the fragmentary-annular-ring-shaped convexes 27f under a predetermined friction force acting between their abutting surfaces. Therefore, the rotation of the inner holder 31 is transmitted to the hub 27 through a first friction engagement path from the flange 31a of the inner holder 31 through the washer 33 to the flange portion 27a of the hub 27 and a second friction engagement path from the flange 31a of the inner holder 31 through the washer 34 to the pair of parallel flat chord portions 27e of the hub 27. The rotation is further transmitted from the hub 27 to the rotary shaft 26. Thus, the rotation of the pulley 21 is transmitted to the rotary shaft 26 and the compressor 24 operates.

During normal operation of the compressor 24, the rubber ring 32 resiliently deforms depending on the torque fluctuation caused by the load fluctuation on the compressor 24 to absorb the torque fluctuation, thereby reducing the noise of the compressor. Delivered torque T during normal operation of the compressor 24 can be expressed by formula 1.

$$T = n \times \mu \times F \times R \qquad 1$$

n: number of friction engagement paths
$\mu$: friction coefficient of the friction engagement surfaces
F: fastening force acting on the nut 36
R: distance between the friction engagement surfaces and the central axis of rotation The power transmission device just described is provided with two friction engagement paths. One is through the washer 33 and the other is through the washer 34. Therefore, n=2 is the power transmission device. When n=2, fastening force F acting on the nut 36b can be reduced to half of that when n=1. Thus, the fatigue life of the disk spring 35 is extended and setting of the disk spring 35 is prevented.

When the compressor breaks down and becomes stuck, excessive torque acts on the friction engagement surfaces. The relation between the friction coefficient $\mu_1$ of the friction engagement between the surfaces of the washer 33 and the fragmentary-annular-ring-shaped convex segments 27f of the hub 27 and the friction coefficient $\mu_2$ of the friction engagement between the surfaces of the washer 33 and the flange 31a of the inner holder 31 is set to be $\mu_2 > \mu_1$. Therefore, slip occurs first at the friction engagement surfaces of the washer 33 and the fragmentary-annular-ring-shaped convex segments 27f of the hub 27 with smaller friction coefficient $\mu_1$. Slip occurs also at the friction engagement surfaces of the washer 34 and the flange 31a of the inner holder 31.

When the washer 33 slips on the flange portion 27a of the hub 27 by a predetermined angle in the direction of rotation, the fragmentary-annular-ring-shaped lugs 33b leave the fragmentary-annular-ring-shaped convexes 27f and the whole body of the washer 33 fits in the concave segment 27g. Thus, the washer 33 moves axially toward the compressor 24 along the cylindrical portion 27d of the hub 27, so that the flange 31a of the inner holder 31 moves axially toward the compressor 24 to abut directly against the fragmentary-annular-ring-shaped convexes 27f of the hub 27.

The disk spring 35 stretches axially and the spring force of the disk spring 35 rapidly decreases. Therefore, the torque transmission through the aforementioned two friction engagement paths rapidly decreases, the torque transmission to the rotary shaft 26 of the compressor 24 is cut off, and fracture of a belt driving the pulley 21 is prevented.

Once the washer 33 leaves the fragmentary-annular-ring-shaped convex segments 27f of the hub 27, the flange 31a of the inner holder 31 connected to the pulley 21 races relative to the flange portion 27a of the hub 27 and the washer 34. The flange 31a rotates stably between the flange portion 27a and the washer 34, so that excessive noise is not produced. As shown in FIG. 3, the inner holder 31 is located so that a preload biasing the inner holder 31 toward the compressor 24 occurs in the rubber ring 32 when the outer holder 30 is fixed to the pulley 21 with the bolts 37. Therefore, the inner holder 31 moves toward the compressor 24 under the resilient force of the rubber ring 32 immediately after the washer 33 leaves the fragmentary-annular-ring-shaped convexes 27f of the hub 27. Thus, the power transmission device operates as a torque limiter.

SUMMARY OF THE INVENTION

The power transmission device taught by Japanese Patent Laid-Open Publication No.311399/1998 comprises a driving rotary member (inner holder 31) provided with a driving friction member (flange 31a) and a driven rotary member (hub 27) provided with a driven friction member (flange portion 27a). The driving friction member and the driven friction member are disposed in line to each other in the extending direction of the rotary shaft 26. An intermediate friction member (washer 33) is disposed between the driving friction member and the driven friction member to be movable in the extending direction of the rotary shaft 26. The relation between the friction coefficient $\mu_1$ of the friction engagement between the surfaces of the driven friction member and the intermediate friction member and the friction coefficients $\mu_2$ of the friction engagement between the surfaces of the driving friction member and the intermediate friction member is set to be $\mu_2 > \mu_1$. The driven friction member is provide with a concave segment 27g in which the intermediate friction member can fit.

The power transmission device of this structure has the following disadvantages.

Even if the initial relation between $\mu_2$ and $\mu_1$ is set $\mu_2 > \mu_1$, it may change to $\mu_2 < \mu_1$, because of rusting, adherence of oil, etc. If the relation between $\mu_2$ and $\mu_1$ becomes $\mu_2 < \mu_1$, slip occurs at the friction engagement surfaces of the driving friction member and the intermediate friction member and not at the friction engagement surfaces of the driven friction member and the intermediate friction member. Therefore, the intermediate friction member does not fit in the concave segment 27g of the driven friction member, so that cut-off of torque transmission cannot be reliably achieved. Moreover, machining of the members of the power transmission device becomes complicated and expensive if the relation 112>111 must be achieved.

Therefore, an object of the present invention is to provide a power transmission device which is free from the defects of the conventional power transmission device, can reliably cut off torque transmission at the time of overload, even if rusting, adherence of oil, etc. occurs, and whose members are simple, easy and inexpensive to machine.

In accordance with the present invention, there is provided a power transmission device comprising a driving rotary member, a driven rotary member fixed to one end of a rotary shaft of a driven device, a first intermediate friction member disposed between the driving rotary member and the driven rotary member to be movable toward the rotary shaft, and a spring for pressing the driving rotary member against the first intermediate friction member, thereby pressing the first intermediate friction member against the driven rotary member, wherein the driving rotary member is provided with a concave segment, the driven rotary member is provided with a convex segment and a concave segment, and the first intermediate friction member is provided with a lug which can fit in the concave segment of the driving rotary member and abut the convex segment of the driven rotary member simultaneously, and also leave the concave segment of the driving rotary member to fit in the concave segment of the driven rotary member, and wherein rotation of the driving rotary member is transmitted to the driven rotary member through the first intermediate friction member with its lug fitting in the concave segment of the driving rotary member and also abutting the convex segment of the driven rotary member during normal operation of the driven device, while when the driven device becomes stuck, the lug of the first intermediate friction member slips off the convex segment of the driven rotary member and leaves the concave segment of the driving rotary member to fit in the concave segment of the driven rotary member, whereby the first intermediate friction member moves toward the rotary shaft of the driven device, pressing force of the spring decreases, and the driving rotary member races.

In accordance with a preferred embodiment of the present invention, the power transmission device further comprises a second intermediate friction member disposed between the driving rotary member and the spring, fitted on the driven rotary member, pressed against the driving rotary member by the spring, and supported by the driven rotary member not to be rotatable relative to the driven rotary member.

In accordance with a preferred embodiment of the present invention, the driving rotary member comprises an outer ring, an internal ring and a rubber ring disposed between the outer ring and the internal ring to be fixed to them.

In accordance with a preferred embodiment of the present invention, the first intermediate friction member is made of ferro-alloy and a magnet is embedded in the concave segment of the driven rotary member.

DETAILED DESCRIPTION OF PREFERRED EMBODIMENT

A preferred embodiment of the present invention will be described based on FIGS. 1 and 2.

As shown in FIG. 1, a power transmission device in accordance with a preferred embodiment of the present invention comprises a pulley 1 provided with a boss 1a, a rim 1b and a web 1c connecting the boss 1a to the rim 1b. The pulley 1 is supported to be rotatable by a cylindrical protrusion 12a of a front housing 12 of a compressor through a ball bearing 13 disposed between the boss 1a of the pulley 1 and the cylindrical protrusion 12a of the front housing 12.

A hub 10 is splined on one end of a rotary shaft 11 of the compressor with a nut 14. The hub 10 is fixed to the rotary shaft 11 with a nut 14.

A washer 6, an inner ring 5, a washer 7 and a disk spring 8 are fitted on the hub 10 in the said order. They are fastened to the hub 10 with a nut 9 threaded onto the hub 10.

The inner ring 5 comprises a cylindrical portion 5a and an inner flange portion 5b. A rubber ring 4 fits on the cylindrical portion 5a of the inner ring 5. An outer ring 3 fits on the rubber ring 4 at its cylindrical portion 3a. The outer ring 3 is fixed to the web 1c of the pulley 1 at its outer flange portion 3b with three bolts 2. The rubber ring 4 is fixed to the cylindrical portion 5a of the inner ring 5 and the cylindrical portion 3a of the outer ring 3.

Figure 2:
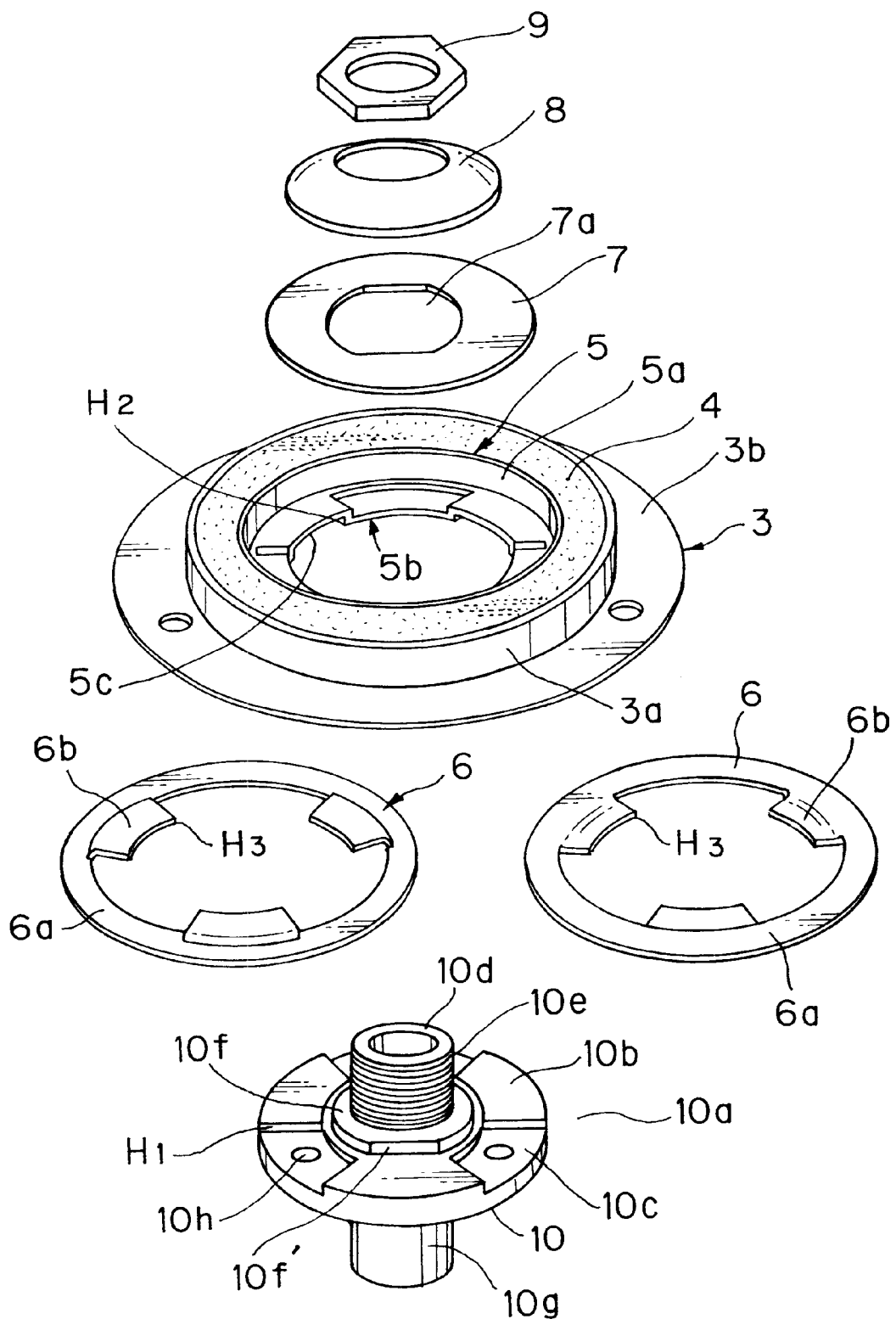

As shown in FIG. 2, the hub 10 is provided with a cylindrical portion 10d at its one end distant from the front housing 12 of the compressor. The cylindrical portion 10d is provided with an externally threaded portion 10e. The hub 10 is provided with a cylindrical portion 10f adjacent the cylindrical portion 10d. Outer diameter of the cylindrical portion 10f is larger than that of the cylindrical portion 10d. The periphery of the cylindrical portion 10f is partially cut away to form a pair of parallel flat chord portions 10f. The hub 10 is provided with a flange portion 10a adjacent the cylindrical portion 10f. The outer diameter of the flange portion 10a is larger than those of the cylindrical portions 10d and 10f.

Three fragmentary-annular-ring-shaped convex segments 10b and three fragmentary-annular-ring-shaped concave segments 10c are formed alternately on the periphery of the end face of the flange portion 10a close to the cylindrical portion 10f. Permanent magnets 10h are embedded in the concave segments 10c. The permanent magnets 10h are fixed to the hub 10 by press fitting, bonding, caulking, etc. The permanent magnets 10h can be replaced with electric magnets.

A cylindrical portion 10g with a small outer diameter is formed on the end face of the flange portion 10a close to the compressor.

The washer 6 is made of ferro-alloy and comprises an annular ring 6a and three fragmentary-annular-ring-shaped lugs 6b radially inwardly protruding from the inner periphery of the annular ring 6a. Inner diameter of the annular ring 6a is larger than the outer diameter of the flange portion 10a of the hub 10. The lugs 6b are bent at their roots and protrude from the annular ring 6a toward the inner ring 5. Shape and size of the lugs 6b are the same as those of the concave segments 10c of the hub 10 and the thickness $H_3$ of the lugs 6b is equal to depth $H_1$ of the concave segments 10c.

The inner ring 5 is provided with three fragmentary-annular-ring-shaped concave segments 5c opposite the three fragmentary-annular-ring-shaped lugs 6b of the washer 6 at its inner flange portion 5b. The shape and size of the concave segments 5c are the same as those of the lugs 6b, but the depth $H_2$ of the concave segments 5c is smaller than the thickness $H_3$ of the lugs 6b.

The washer 7 is provided with a central opening 7a with the same shape as the cylindrical portion 10f of the hub 10.

The washer 6, the inner ring 5, the washer 7, the disk spring 8 and the nut 9 are mounted on the hub 10 such that the lugs 6b of the washer 6 fit in the concave segments 5c of the inner ring 5 and abut against the convex segments 10b of the hub 10 simultaneously, the washer 7 fits on the cylindrical portion 10f of the hub 10 to be supported by the hub 10 not to be rotatable relative to the hub 10 and abuts the inner flange 5b of the inner ring 5 simultaneously, the disk spring 8 abuts the washer 7, and the nut 9 threads onto the externally threaded portion 10e of the hub 10 to press the disk spring 8 against the washer 7, thereby pressing the washer 7 against the inner flange portion 5b of the inner ring 5, pressing the inner flange portion 5b against the lugs 6b of the washer 6, and pressing the lugs 6b against the convex segments 10b of the hub 10.

The operation of the present power transmission device will be described.

The pulley 1 is driven by a power source not shown in FIGS. 1 and 2 through an endless belt extending between the power source and the pulley 1.

During normal operation of the compressor, rotation of the pulley 1 is transmitted to the inner ring 5 through the outer ring 3 and the rubber ring 4. The rotation of the inner ring 5 is transmitted to the washer 6 through the lugs 6b fitting in the concave segments 5c. The rotation of the washer 6 is transmitted to the hub 10 through friction force acting between the abutting surfaces of the lugs 6b and the convex segments 10b. The rotation of the hub 10 is transmitted to the rotary shaft 11 through the spline connection between them and finally to the compressor. The rotation of the inner ring 5 is also transmitted to the washer 7 through friction force acting between the abutting surfaces of the flange portion 5b and the washer 7. The rotation of the washer 7 is transmitted to the hub 10 through the engagement between the washer 7 and the cylindrical portion 10f not permitting the relative rotation of the washer 7 to the hub 10 and finally to the compressor.

During normal operation of the compressor, the rubber ring 4 resiliently deforms depending on the torque fluctuation caused by the load fluctuation on the compressor to absorb the torque fluctuation, thereby reducing the noise of the compressor.

The present power transmission device is provided with two friction engagement paths. One is through the washer 6 and the other is through the washer 7. Disposition of two friction engagement paths enables increase of transmitted torque during the normal operation of the compressor relative to that in the case of disposition of one friction engagement path even if the fastening force of the nut is the same in the both cases.

When the compressor breaks down and becomes stuck, excessive torque acts on the washer 6. Therefore, rotating force acting on the washer 6 exceeds the maximum static friction force acting between the abutting surfaces of the lugs 6b and the convex segments 10b. The lugs 6b slip off the convex segments 10b to fit in the concave segments 10c and leave the concave segments 5c. The lugs 6b are held in the concave segments 10c under the magnetic force of the permanent magnets 10b. The washer 6 stops rotation. The surface of the lugs 6b opposite the inner ring 5 extends flush with the surface of the convex segments 10b opposite the inner ring 5. The washer 6 moves toward the compressor by a distance of $H_1$ and the inner ring 5 moves toward the compressor by a distance of $H_1$–$H_2$. The disk spring 8 stretches toward the compressor and its spring force decreases. Friction forces acting between the abutting surfaces of the flange portion 5b and the lugs 6b, the flange portion 5b and the convex segments 10b, and the flange portion 5b and the washer 7 decrease. Therefore, the inner ring 5 slips relative to the washers 6 and 7 and races. Thus, torque transmission to the compressor is cut off. The inner ring 5 is located so that a preload biasing the inner ring 5 toward the compressor occurs in the rubber ring 4 when the outer ring 3 is fixed to the pulley 1 with the bolts 2. Therefore, the inner ring 5 moves toward the compressor under the resilient force of the rubber ring 4 immediately after the washer 6 leaves the fragmentary-annular-ring-shaped convex segments 10b of the hub 10. Thus, the present power transmission device operates as a torque limiter.

During normal operation of the compressor, the lugs 6b fit in the concave segments 5c, while abutting against the convex segments 10b. Therefore, if excessive torque acts on the inner ring 5 because the compressor sticks, the lugs 6b slip off the convex segments 10 to fit in the concave segment 10c and the torque transmission to the compressor is reliably cut off. Even if rusting, adherence of oil, etc. occurs on the members, the torque transmission to the compressor is reliably cut off when the compressor breaks down and becomes stuck.

The friction coefficient at the abutting surfaces of the lugs 6b and the concave segments 5c need not be different from that at the abutting surfaces of the lugs 6b and the convex segments 10b. Therefore, machining of the members is simple and easy.

What is claimed is:

1. A power transmission device comprising a driving rotary member, a driven rotary member fixed to one end of a rotary shaft of a driven device, a first intermediate friction member disposed between the driving rotary member and the driven rotary member to be movable toward the rotary shaft, and a spring for pressing the driving rotary member against the first intermediate friction member, thereby pressing the first intermediate friction member against the driven rotary member, wherein the driving rotary member is provided with at least one first concave segment, the driven rotary member is provided with at least one convex segment and at least one second concave segment, and the first intermediate friction member is provided with at least one lug which engages the at least one first concave segment and simultaneously abuts the at least one convex segment, wherein when a torque applied to the driving rotary member exceeds a predetermined torque the at least one lug slips off the at least one convex segment disengages from the at least one first concave segment, and engages the at least one second concave segment.

2. A power transmission device of claim 1, wherein the first intermediate friction member is made of ferro-alloy and a magnet is embedded in the at least one second concave segment.

3. A power transmission device of claim 1, further comprising a second intermediate friction member disposed between the driving rotary member and the spring, fitted on the driven rotary member, pressed against the driving rotary member by the spring, and supported by the driven rotary member not to be rotatable relative to the driven rotary member.

4. A power transmission device of claim 3, wherein the first intermediate friction member is made of ferro-alloy and a magnet is embedded in the at least one second concave segment.

5. A power transmission device of claim 3, wherein the driving rotary member comprises an outer ring, an internal ring and a rubber ring disposed between the outer ring and the internal ring to be fixed to them.

6. A power transmission device of claim 5, wherein the first intermediate friction member is made of ferro-alloy and a magnet is embedded in the at least one second concave segment.

7. A power transmission device of claim 1, wherein the driving rotary member comprises an outer ring, an internal ring and a rubber ring disposed between the outer ring and the internal ring to be fixed to them.

8. A power transmission device of claim 7, wherein the first intermediate friction member is made of ferro-alloy and a magnet is embedded in the at least one second concave segment.

* * * * *